(12) United States Patent
Yanagino et al.

(10) Patent No.: US 7,225,140 B2
(45) Date of Patent: May 29, 2007

(54) METHOD OF AND SYSTEM FOR FORECASTING FUTURE ORDERS IN PARTS INVENTORY SYSTEM

(75) Inventors: Tameo Yanagino, Tokyo (JP); Yukihiko Suzaki, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 992 days.

(21) Appl. No.: 09/929,356

(22) Filed: Aug. 15, 2001

(65) Prior Publication Data

US 2002/0026347 A1 Feb. 28, 2002

(30) Foreign Application Priority Data

Aug. 30, 2000 (JP) ............................. 2000-260918

(51) Int. Cl.
*G06Q 17/30* (2006.01)

(52) U.S. Cl. ........................................ 705/10
(58) Field of Classification Search ................. 705/10, 705/28

See application file for complete search history.

(56) References Cited

U.S. PATENT DOCUMENTS

| | | | |
|---|---|---|---|
| 4,414,629 A * | 11/1983 | Waite ........................... | 705/28 |
| 5,608,621 A * | 3/1997 | Caveney et al. ............... | 705/10 |
| 5,765,143 A | 6/1998 | Sheldon et al. | |
| 5,893,076 A * | 4/1999 | Hafner et al. .................. | 705/28 |
| 6,006,196 A * | 12/1999 | Feigin et al. .................. | 705/10 |
| 6,144,945 A * | 11/2000 | Garg et al. .................... | 705/28 |
| 6,253,187 B1 * | 6/2001 | Fox .............................. | 705/10 |
| 6,567,824 B2 * | 5/2003 | Fox .............................. | 705/10 |
| 6,611,726 B1 * | 8/2003 | Crosswhite .................... | 705/28 |
| 6,816,839 B1 * | 11/2004 | Gung et al. .................... | 705/10 |
| 6,826,538 B1 * | 11/2004 | Kalyan et al. .................. | 705/7 |
| 6,978,249 B1 * | 12/2005 | Beyer et al. .................. | 705/10 |

(Continued)

FOREIGN PATENT DOCUMENTS

DE 19848094 A1 * 4/2000

(Continued)

OTHER PUBLICATIONS

Mujtaba, Enterprise modeling and simulation: complex dynamic behavior of a simple model of manufacturing, Dec. 1994, Hewlett-Packard Journal, v.45, n.6, p. 80-113 (34 pages).*

(Continued)

*Primary Examiner*—Susanna M. Diaz
(74) *Attorney, Agent, or Firm*—Arent Fox LLP

(57) ABSTRACT

In part inventory management, in order to accurately forecast future number of orders of parts for which order has, for example, fallen to one unit per month or fewer, low-order-rate parts whose order rates to have fallen below the predetermined level are extracted, a parameter indicating a characteristic of orders is determined and classification into multiple categories is conducted. Then, using the parameter, an order occurrence probability distribution is calculated for each category. Monte Carlo simulation is carried out based on the calculated order occurrence probability distributions to determine occurrence rate probability distributions of number of orders during a predetermined period, and the future number of orders of the low-order-rate parts are forecast based on the calculated occurrence rate probability distributions of number of orders during the predetermined period.

12 Claims, 11 Drawing Sheets

U.S. PATENT DOCUMENTS

2001/0049690 A1* 12/2001 McConnell et al. ..... 707/104.1
2005/0283412 A1* 12/2005 Cheng et al. ................. 705/28

FOREIGN PATENT DOCUMENTS

| JP | 08147357 A | * | 6/1996 |
| JP | 11-007482 | | 1/1999 |
| JP | 2000003388 A | * | 1/2000 |

OTHER PUBLICATIONS

Masters, Determination of near optimal stock levels for multi-echelon distribution inventories, !((#, Journal of Business Logistics, v.14, n.2, p. 165-195 (31 pages).*

Patent Abstracts of Japan, Publication No. 2002-073746 of Application No. 2000-260918, [online], [retrieved Dec. 3, 2005 via Japan Patent Office website, Ind Prop Dig Lib, PAJ database, URL: <http://www19.ipdl.ncipi.go.jp/PA1/cgi-bin/PA1DETAIL>.*

Morita, The regression-analog to survival analysis: a selected application to turnover research, Academy of Management Journal, Dec. 1993, v.39, n.6, p. 1430 (35 pages).*

Price et al. "How to Prepare Inventory Forecasts for Very Low Demand Items." Journal of Business Forecasting, vol. 5, No. 2, pp. 21-22, Summber 1986.*

Heuts et al. "A Combined Forecast-Inventory Control Procedure for Spare Parts." Presented at the Conference on Flexible Automation & Intelligent Manufacturing (FAIM '99).*

Keaton, Mark. "Determining Reorder Points When Lead Time is Random: A Spreadsheet Implementation." Production and Inventory Management Journal, First Quarter, 1995.*

Palmer, Michael. "Get It Right: Use Monte Carlo Simulation When Projecting Hotel Construction Loans." The Journal of Lending & Credit Risk Management, vol. 81, No. 5, p. 38(7), Jan. 1999.*

Altiok, Tayfur. "(R. r) Production/Inventory Systems." Operations Research, vol. 37, No. 2, pp. 266-276, Mar./Apr. 1989.*

Walker, John. "Decision Support for the Single-Period Inventory Problem." Industrial Management + Data Systems, vol. 100, No. 2, pp. 61-66, 2000.*

Razi, Muhammad Abdullah-Al. "Periodic Review Inventory Control Model for Slow Moving Spare Parts" (abstract). Dissertation Abstracts International, vol. 60/06-A, p. 2127, 1999.*

Keaton, Mark. "Using the Gamma Distribution to Model Demand When Lead Time is Random." Journal of Business Logistics, vol. 16, No. 1, 1995.*

"Poisson Regression" definition retrieved from the Wikipedia web site on Jun. 7, 2006 [URL: http://en.wikipedia.org/wiki/Poisson_regression].*

"Regression Analysis" definition retrieved from the Wikipedia web site on Jun. 7, 2006 [URL: http://en.wikipedia.org/wiki/Regression_analysis].*

"Regression Analysis" definition retrieved from the 12Manage web site on Jun. 7, 2006 [URL: http://www.12manage.com/methods_regression_analysis.html].*

"Monte Carlo method" definition retrieved from the Wikipedia web site on Jun. 5, 2006 [URL: http://en.wikipedia.org/wiki/Monte_Carlo_method].*

"Monte Carlo simulation" definition retrieved from the Decisioneering web site on Jun. 5, 2006, [URL: http://www.decisioneering.com/monte-carlo-simulation.html].*

Price et al. "How to Prepare Inventory Forecasts for Very Low Demand Items." Journal of Business Forecasting, vol. 5, No. 2, pp. 21-22, Summer 1986.*

Canadian Office Action dated Mar. 11, 2004, Application No. 2,381,569, Owner: Honda Giken Kogyo Kabushiki Kaisha, Title: Method of Forecasting Future Orders in Parts Inventory Management.

* cited by examiner

METHOD OF AND SYSTEM FOR FORECASTING FUTURE ORDERS IN PARTS INVENTORY SYSTEM

BACKGROUND OF THE INVENTION

1. Field of the Invention

This invention relates to a method of and a system for forecasting future orders in part inventory management, particularly to a method of and a system for forecasting future number of orders or demand of low-order-rate parts whose order rates have fallen below a predetermined level.

2. Description of the Related Art

In the manufacturing industry, numerous kinds of product parts (spare parts), such as parts for vehicles that have been sold to users, must be stocked for predetermined time periods and supplied in response to orders from dealers and users. At present, part inventories are ordinarily estimated by an expert who uses appropriate techniques to predict future number of orders.

Japanese Laid-open Patent Application No. Hei 11(1999)-7482 teaches a method that uses Monte Carlo simulation to project how much inventory should be stocked by intermediate suppliers in a distribution network.

Ordinarily, orders or demand for a part(s) are relatively active while the product is in production and for a while after production is discontinued but thereafter gradually decline, eventually reaching a rate of around one (one unit) per month.

While orders are brisk, the large number of transactions generates much transaction data that make projection of the optimum inventory level relatively easy. As orders decline, however, forecasting becomes increasingly difficult. At a low order rate, even an expert has difficulty predicting future number of orders with good accuracy.

The fact is, however, that parts whose order rates have become low make up the majority. In addition, low-order-rate parts pose incidental issues that require resolution, such as whether or not to discard the dies used to manufacture the parts.

Accurate forecasting is therefore desired with regard to end orders or demand (from users, dealers and so on) for parts, particularly low-order-rate parts. The method offered by the prior-art mentioned above is limited to use of Mote Carlo simulation for forecasting the optimum inventories to stock at intermediate suppliers based on end orders known beforehand.

SUMMARY OF THE INVENTION

An object of this invention is therefore to overcome the foregoing problems by providing a method of and a system for forecasting future orders in part inventory management that is capable of accurately forecasting future end orders, i.e., orders or demand from users, dealers and the like, for parts, particularly of low-order-rate parts.

This invention achieves the foregoing object by, in a first aspect, providing a method of forecasting future orders of parts for products sold to customers, comprising the steps of: determining a time-course record of orders with respect to each part and extracting low-order-rate parts whose order records show order rate to have fallen below the predetermined level; determining from each such order record at least one parameter indicating a characteristic of orders after the order rate fell below the predetermined level, classifying the extracted low-order-rate parts into multiple categories and using the parameter indicating the characteristic of orders to calculate for each of the multiple categories an order occurrence probability distribution; carrying out Monte Carlo simulation based on the calculated order occurrence probability distributions to determine occurrence rate probability distributions of number of orders during a predetermined period; and forecasting future number of orders of the low-order-rate parts based on the calculated occurrence rate probability distributions of number of orders during the predetermined period.

This invention achieves the foregoing object by, in a second aspect, providing, a method of forecasting future orders of parts for products sold to customers, comprising the steps of: determining a time-course record of orders with respect to each part and extracting low-order-rate parts whose order records show order rate to have fallen below the predetermined level; determining from each such order record an order occurrence probability distribution as a function of time and an order occurrence probability distribution as a function of a ratio of number of orders; carrying out Monte Carlo simulation based on the calculated order occurrence probability distributions to determine occurrence rate probability distributions of number of orders during a predetermined period; and forecasting future number of orders of the low-order-rate parts based on the calculated occurrence rate probability distributions of number of orders during the predetermined period.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

A method of and a system of forecasting future orders in part inventory management according to an embodiment of this invention will now be explained with reference to the attached drawings.

Figure 1:
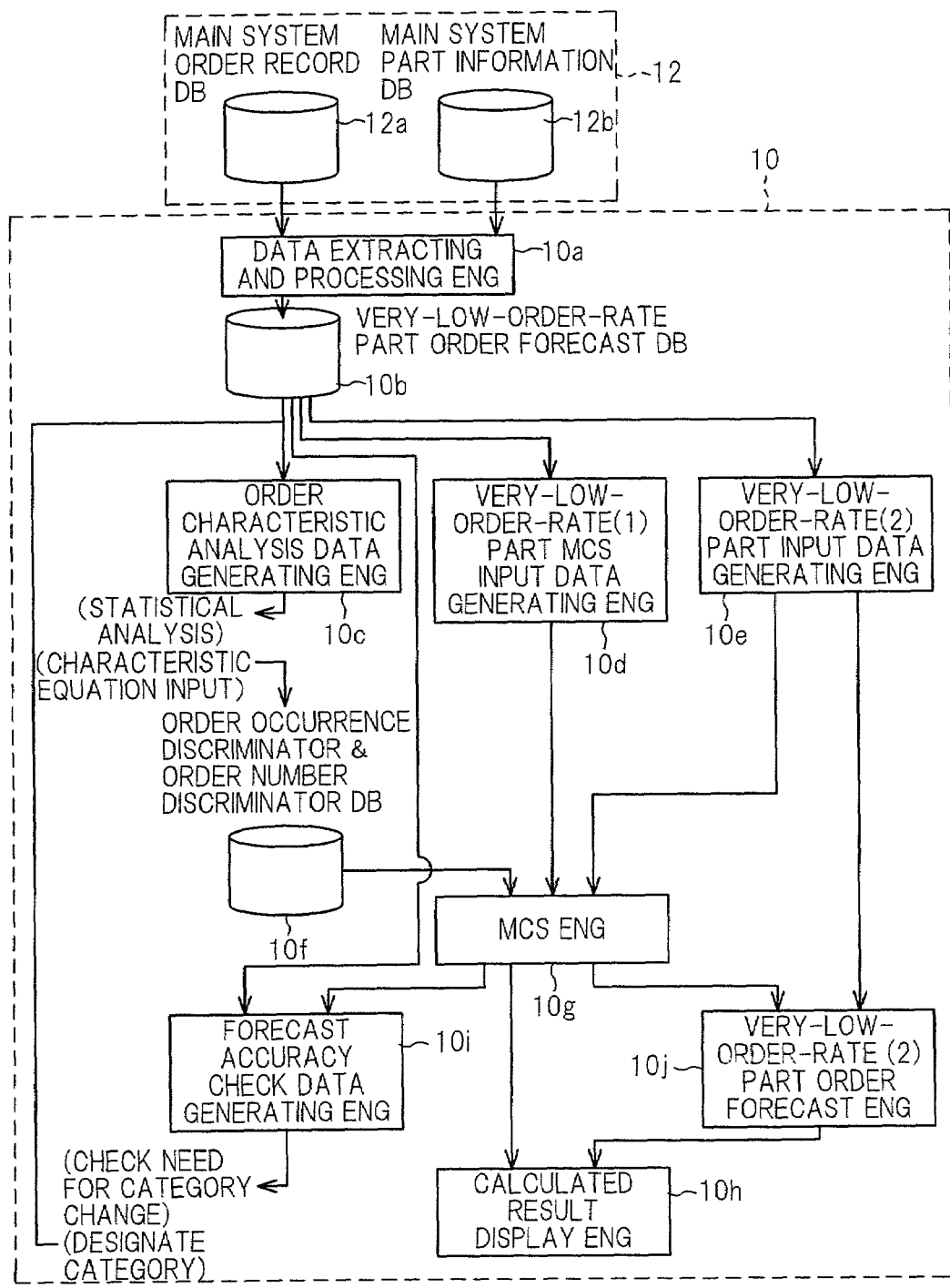
FIG. 1 is block diagram comprehensively illustrating a method of and a system for forecasting future orders in part inventory management according to an embodiment of this invention in terms of the processing conducted by a device (microcomputer) used to implement the method.

FIG. 1 is block diagram for explaining a method of and a system for forecasting future orders in part inventory management according to an embodiment of this invention.

In FIG. 1, the method of forecasting future orders is represented as the processing (indicated as ENG (engine) in the drawing) of a device 10, constituted as a microcomputer, for implementing the method.

As shown in the FIG. 1, the device 10 is connected with a mainframe computer (or a host computer; not shown) 12 including a main system order record DB (database) 12a and a main system part information DB (database) 12b. The device 10 accesses them to acquire order records and information regarding parts for products that have been sold to customers. The part information refers to part names, part numbers, destinations (shipping addresses), prices and the like.

In this embodiment, the products sold to customers are defined as being divided into three types: four-wheeled vehicles, motorcycles (two-wheeled vehicles), and general-purpose products, including general-purpose engines. The parts are defined as components of these products (spare parts). The parts are separately transacted in units of one each and assigned part numbers.

A data extracting and processing ENG (engine) 10a determines a time-course record of orders with respect to the individual parts of four-wheeled vehicles etc. based on the acquired data and extracts first low-order-rate parts (group of parts) whose order rates have fallen below a first level and second low-order-rate parts (group of parts) whose order rates have fallen below a second predetermined level higher than the first predetermined level.

Figure 2:
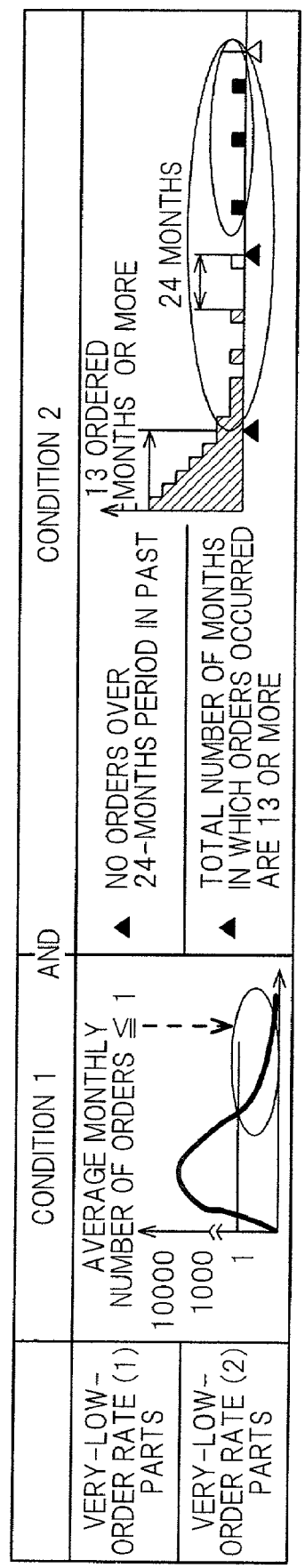
FIG. 2 is an explanatory diagram showing processing for extracting low-order-rate parts (very-low-order-rate (1) parts and very-low-order-rate (2) parts) conducted in the future order forecasting method of FIG. 1.

FIG. 2 is an explanatory view illustrating these tasks.

As shown, the order rate of a part is defined as falling below the first predetermined level when the average monthly number of orders for the part is one or fewer and the part has a history of experiencing no order over a period of 24 months sometime in the past. Parts meeting this condition are collectively defined as first low-order-rate parts (hereinafter also referred to as "very-low-order-rate (1) parts").

Further, the order rate of a part is defined as falling below the second predetermined level when the average monthly number of orders for the part is one or fewer and the total number of months in which orders occurred is 13 or more. Parts meeting this condition are collectively defined as second low-order-rate parts (hereinafter also referred to as "very-low-order-rate (2) parts").

By "the average monthly number of orders for the part is one or fewer and the total number of months in which the number of orders occurred is 13 or more" is meant that the part currently has an average monthly order rate of not greater than one unit but the number of months, consecutive or not, in which one or more number of orders occurred in the past totals 13 or more.

Specifically, as shown on the left side of FIG. 2, orders or demand for a part(s) is generally relatively active, on the order of 5,000 units per month, for example, while the product is in production and for a while after production is discontinued but thereafter gradually declines, eventually reaching a rate of around one (one unit) per month.

As termed in this specification, "orders" mean end orders (demand), from users, dealers and so on, and "number of orders" means number of parts ordered (more precisely number of part units ordered). Therefore, the number of orders during a month is, for instance, three both when three units of a part are ordered at one time and when three units of a part are ordered separately one by one.

As will be understood from the foregoing definitions, when the number of orders for a part declines, the part first becomes a very-low-order-rate (2) part and then becomes a very-low-order-rate (1) part. The data extracting and processing ENG 10a extracts the very-low-order-rate (1) parts and the very-low-order-rate (2) parts.

Returning to the explanation of FIG. 1, information regarding the very-low-order-rate (1) parts and the very-low-order-rate (2) parts extracted by the data extracting and processing ENG 10a is once stored in a very-low-order-rate part order forecast DB (database) 10b.

The stored very-low-order-rate part information is then sent to an order characteristic analysis data generating ENG 10c, a very-low-order-rate (1) part MCS (Monte Carlo simulation) input data generating ENG 10d, and a very-low-order-rate (2) part input data generating ENG 10e.

The very-low-order-rate part information sent to the order characteristic analysis data generating ENG 10c is subjected to statistical analysis and characteristic equation input processing and then input to an order occurrence discriminator and order number discriminator database 10f including an order occurrence discriminator and order number discriminator for each part category. The order occurrence discriminator and order number discriminator DB 10f classifies the low-order-rate parts (very-low-order-rate (1) parts) extracted from the record of ordered parts into multiple categories based on at least one parameter indicating a characteristic of orders after the order rate fell below the first level.

The multiple categories are not limited to the three mentioned earlier (four-wheeled vehicles, motorcycles, and general-purpose products) but may be further subdivided into, say, 24, 50, 100 or more groups.

The data input to the order occurrence discriminator and order number discriminator DB (database) 10f are sent to an MCS (Monte Carlo simulation) ENG 10g together with the data stored in the very-low-order-rate (1) part MCS input data generating ENG 10d.

The "order occurrence discriminator" and "order number discriminator" are the "at least one parameter indicating a characteristic of orders after the order rate fell below the predetermined level" and more specifically, parameters indicating an order occurrence interval and a ratio of number of orders.

Based on the parameters indicating characteristics of orders, the MCS ENG 10g determines two types of order occurrence probability distribution for the products falling in each category and inputs the determined order occurrence probability distributions to the Monte Carlo simulation to determine the occurrence rate probability distribution of number of orders during a predetermined period N.

The order forecast method used in the Monte Carlo simulation will now be explained.

Monte Carlo simulation (also called "Monte Carlo analysis" or "Monte Carlo technique") is a methodology that solves problems by returning what has been expressed as a formula to the realm of probability. It is commonly used to obtain an approximate solution for a problem that cannot be solved by analytical techniques.

Figure 3:
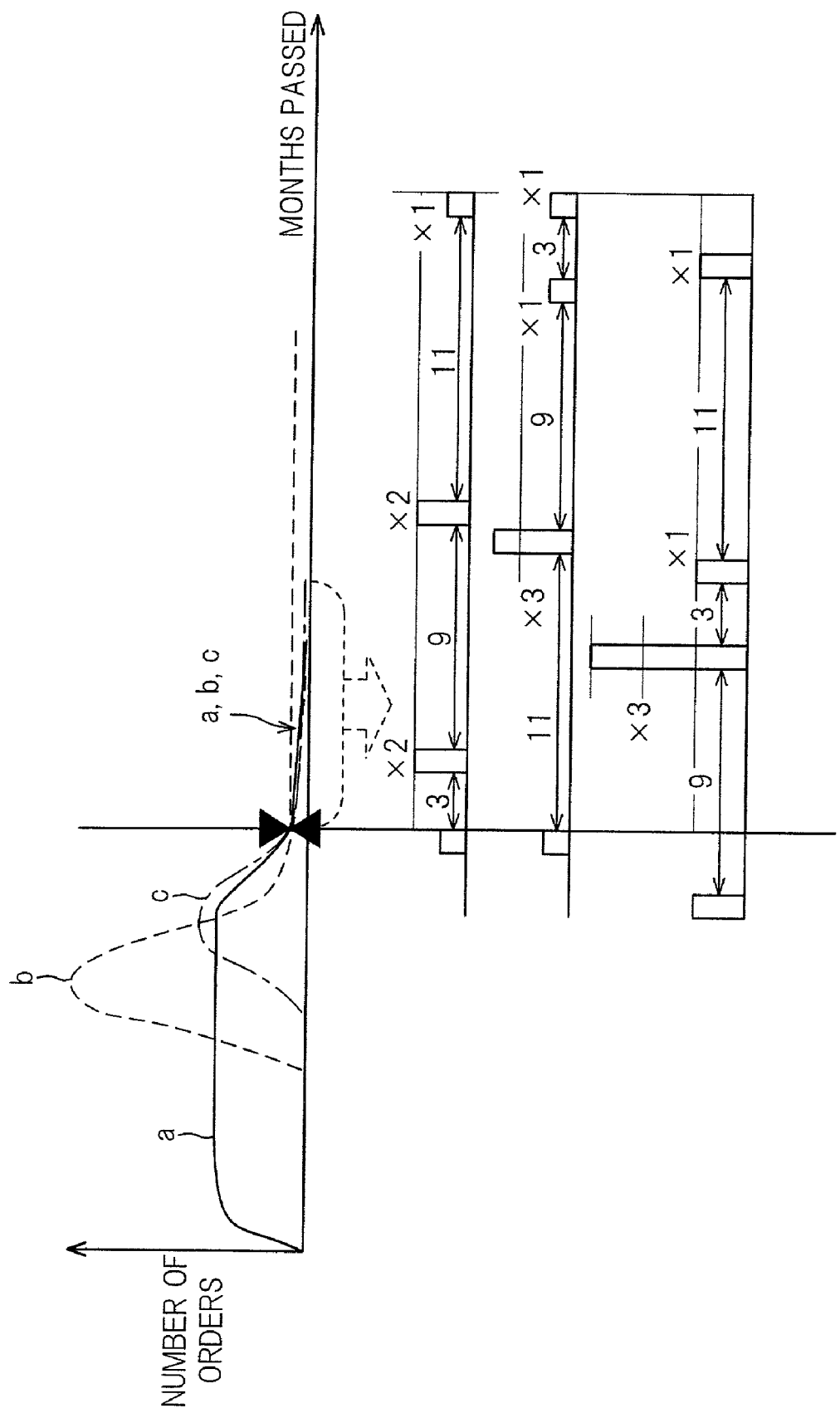
FIG. 3 is an explanatory diagram showing the time-course fluctuation in the number of orders forecast by the future order forecasting method of FIG. 1.

Through their extensive studies with regard to the forecasting of the number of orders for low-order-rate parts, the inventors discovered that after the order rate for a part has fallen to a low level, the number of orders of the part exhibits certain characteristics (follows certain rules). FIG. 3 shows the time-course fluctuation in number of orders (monthly average) for three parts designated a, b and c. As illustrated, during the period where orders are active, the number of orders differs between different parts.

After demand diminishes and the number of orders falls to a low level, however, then, when the monthly number of orders for each of the parts falls to one or fewer and each comes to have a history of experiencing no order over a period of 24 months, the orders or demand individuality among the parts fade and the number of orders of the parts a, b and c approaches a common pattern. The orders for the parts can therefore be viewed as exhibiting substantially the same characteristic.

Therefore, by focusing on these time points (time points where order rates fall below the first predetermined level), i.e., by aligning the time points at which the rates become low), the number of orders of multiple parts can be gasped in terms of a common characteristic.

Through a further study of the time-course order records (data) shown in FIG. 3, the inventors discovered that the transaction behavior of a low-order-rate part expresses what expresses the number of months since the last order (irrespective of number of units ordered), i.e., by the order occurrence probability distribution as a function of time, more specifically, the probability distribution of order occurrence in the following month.

They further discovered that the record of orders (data) is expresses what expresses how many number of parts were ordered after order remained nil for, say, 24 months, as a function of the number of orders before the nil period, i.e., by the order occurrence probability distribution as a function of the ratio of number of orders. Note that x1, x2 and x3 in FIG. 3 denote that the number of parts ordered after the nil order period as multiples of the number of parts ordered before the nil order period.

Thus, by taking the order behavior before and after the nil period into account in terms of number of parts ordered, the order occurrence probability distribution can be accurately determined. The accuracy with which the future number of orders of the low-order-rate parts can be forecast is therefore further enhanced.

Figure 4:
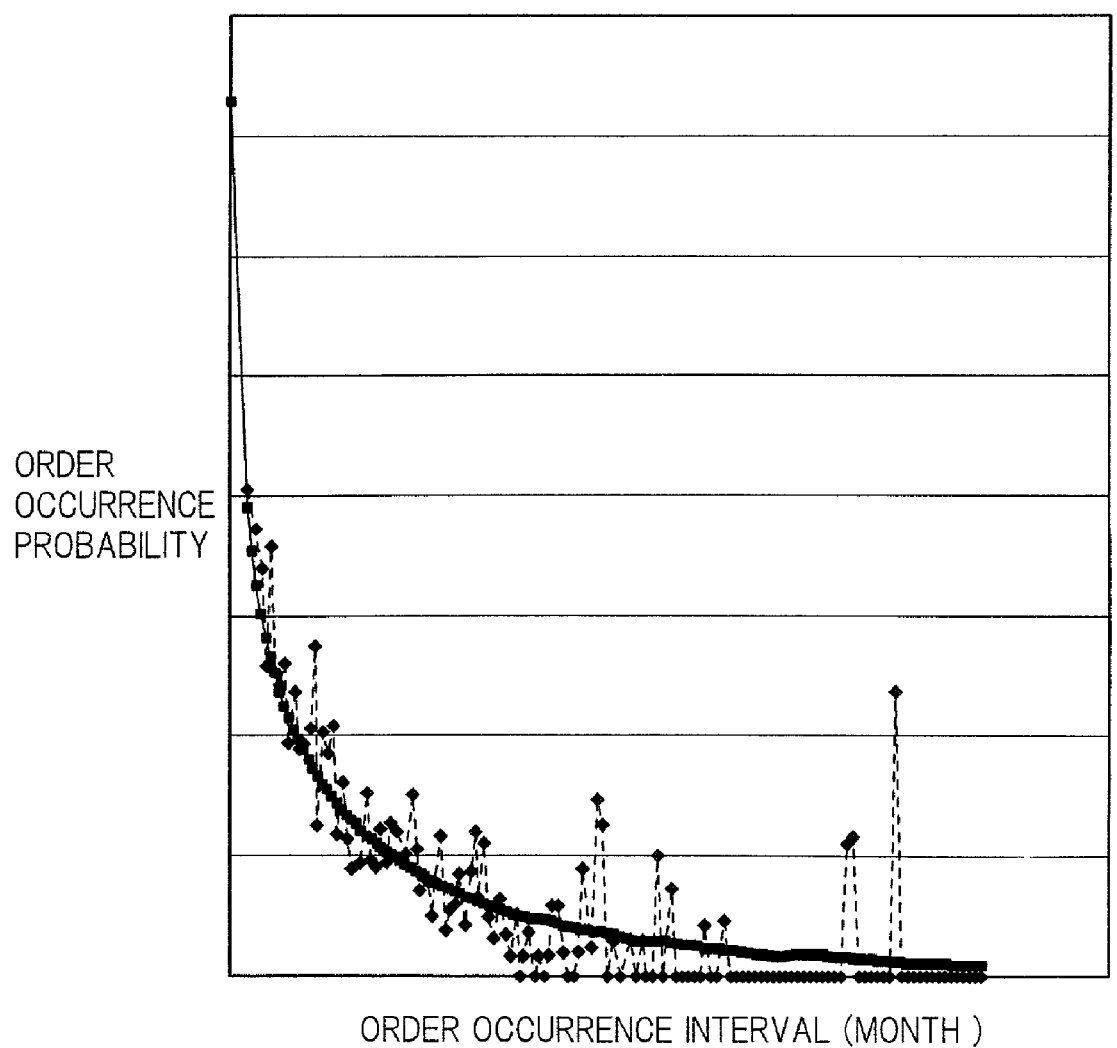
FIG. 4 is an explanatory diagram showing order occurrence probability distribution as a function of order occurrence interval (a parameter indicating a characteristic of orders), which constitutes Monte Carlo simulation input in the future order forecasting method shown in FIG. 1.

FIG. 4 shows order occurrence probability distribution as a function of time, more specifically, order occurrence probability distribution as a function of order occurrence interval (month), obtained by approximately plotting time-course order record data (represented by dots) based on the foregoing knowledge.

Figure 5:
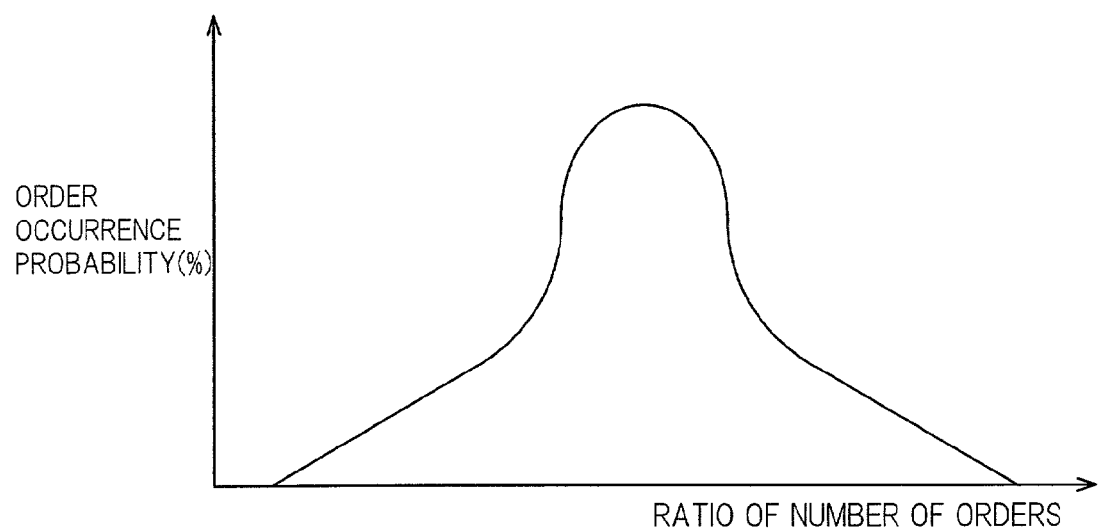
FIG. 5 is an explanatory diagram showing order occurrence probability distribution as a function of a ratio of number of orders (a parameter indicating a characteristic of orders), which constitutes Monte Carlo simulation input in the future order forecasting method shown in FIG. 1.

FIG. 5 shows order occurrence probability distribution as a function of the ratio of number of orders obtained by analyzing the time-course order record.

The "ratio of number of orders" is the ratio of the number of orders after order expired to the number of orders before order expired. More specifically: ratio of number of orders= (number of orders in month in which orders occurred after orders were nil for 24 months)/(number of orders immediately before orders were nil for 24 months). Simply stated, the ratio of number of orders is the ratio between number of orders after and before order expired.

The characteristics illustrated in FIGS. 4 and 5 differ depending on the kind of part. The extracted very-low-order-rate (1) parts are therefore classified into multiple categories. Then, as shown respectively in FIGS. 6 and 7, the order occurrence probability distribution as a function of time (shown in FIG. 4) and the order occurrence probability distribution as a function of the ratio of number of orders (shown in FIG. 5) are determined for each category.

The classification of the parts into categories is done by determining for each very-low-order-rate (1) part the order occurrence interval and the ratio of number orders (parameters indicating characteristics of orders after the order rate fell below the predetermined level) and placing parts with similar parameters into the same category.

Figure 6:
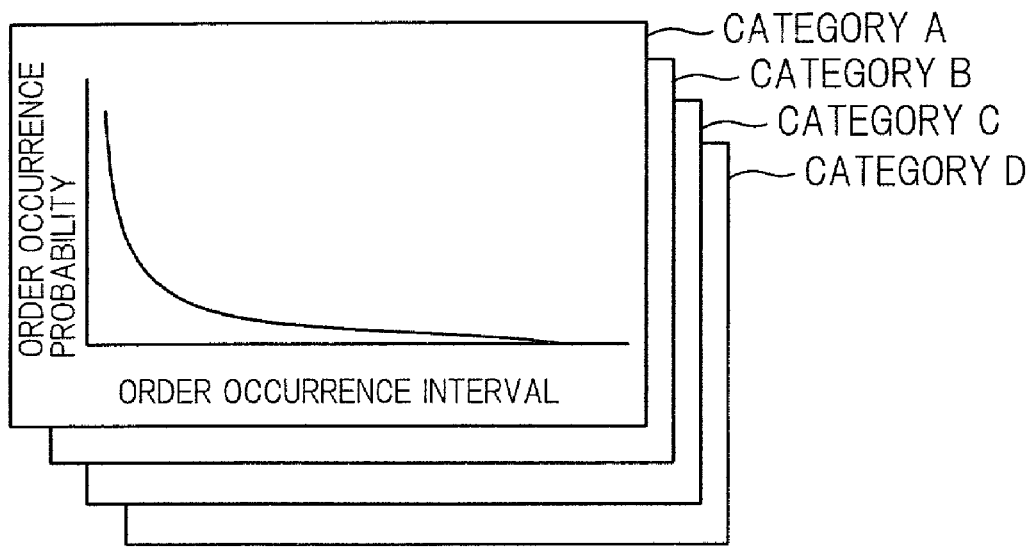
FIG. 6 is an explanatory diagram showing an example of the order occurrence probability distribution as the function of order occurrence interval shown in FIG. 4 calculated for every part category.
Figure 7:
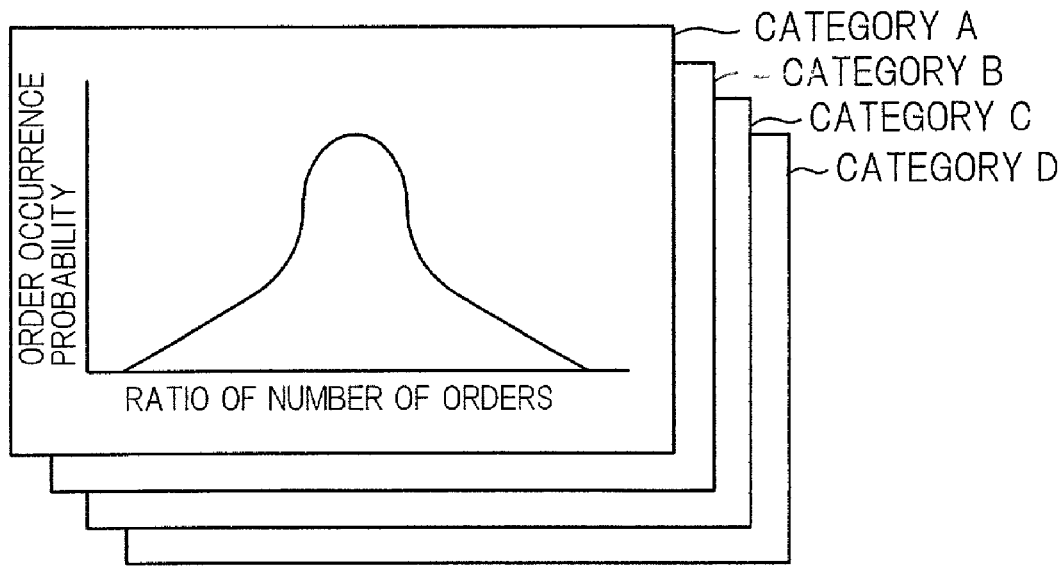
FIG. 7 is an explanatory diagram showing an example of the order occurrence probability distribution as the function of the ratio of number of orders shown in FIG. 5 calculated for every part category.

Although only four categories, A, B, C and D, are shown in FIGS. 6 and 7, this is only for simplicity of illustration and the parts are actually subdivided into 24, 50 or more categories.

Figure 8:
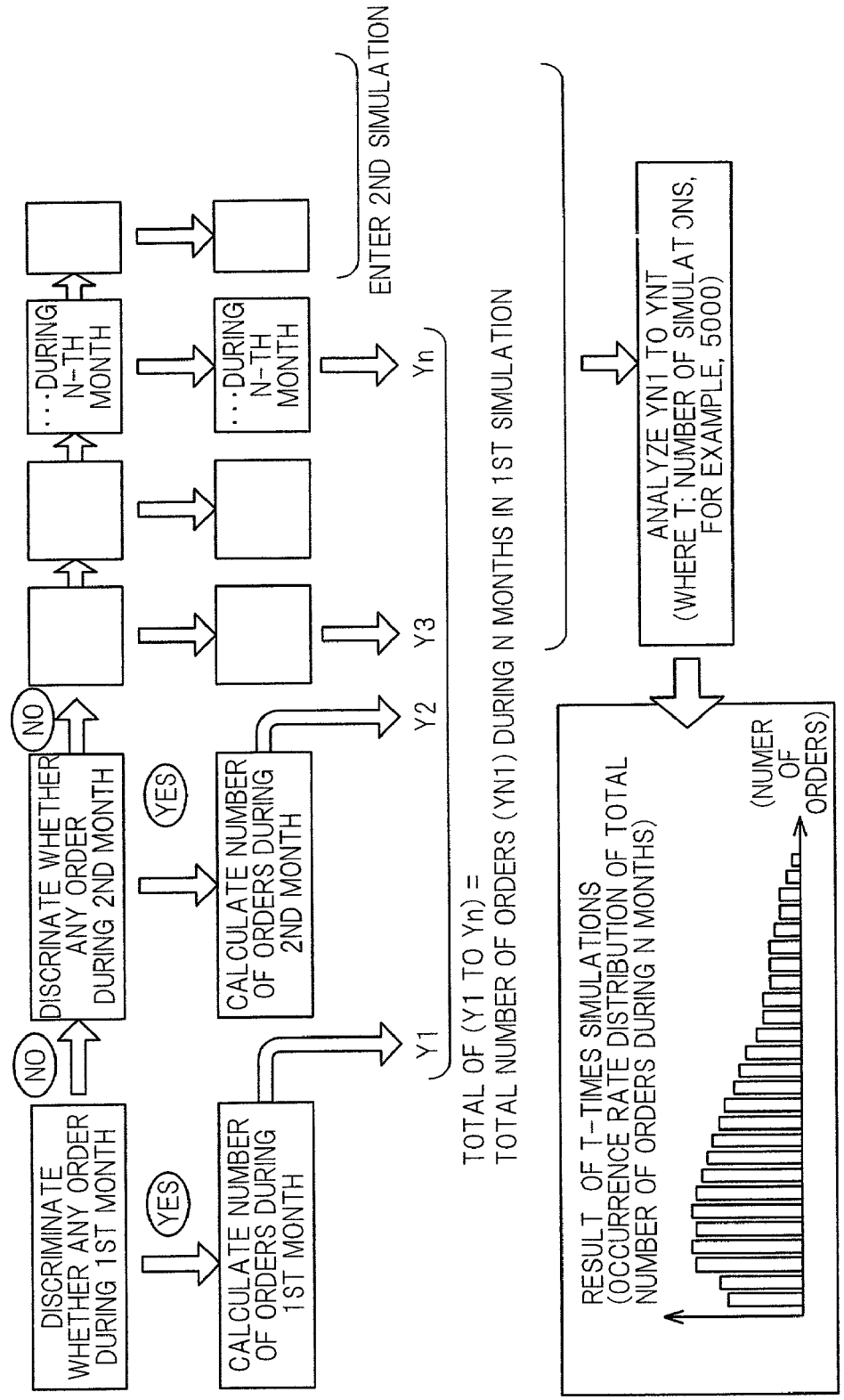
FIG. 8 is an explanatory diagram showing Monte Carlo simulation conducted in the future order forecasting method of FIG. 1 using the order occurrence probability distributions of FIGS. 6 and 7.
Figure 9:
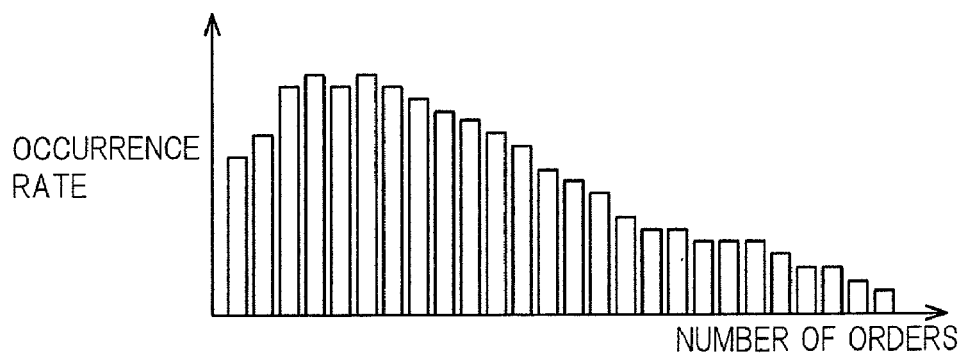
FIG. 9 is an explanatory diagram showing occurrence rate probability distribution of number of orders during a predetermined period (N months) obtained by the Monte Carlo simulation of FIG. 8.

Next, as shown in FIG. 8, Monte Carlo simulation is repeated (e.g., 5,000 times) based on the two types of order occurrence probability distribution shown in FIGS. 6 and 7. By this, as shown in FIG. 9, it is determined at what probability how many parts will be ordered during an interval of how many months, i.e., the probable total number of orders during a predetermined period (N months).

With respect to the category to which the parts belong, the two determined order occurrence probability distributions shown in FIGS. 6 and 7 are selected and the Monte Carlo simulation is carried out separately for each selected order occurrence probability distribution.

In other words, this invention was accomplished based on the knowledge that future number of orders, an unknown, can be forecast by assuming that the order occurrence probability distribution in the future will be the same as the past order occurrence probability distribution known from the record of orders.

Thus, at least one of the order occurrence probability distribution as a function of time and the ratio of number of orders is focused on as a parameter indicating an order characteristic, the order occurrence probability distribution is calculated and the calculated order occurrence probability distribution is used as Monte Carlo simulation input. As a result, the order occurrence rate probability distribution can be obtained for like predetermined periods as the output of the Monte Carlo simulation. As a result, the accuracy with which the future number of orders of the low-order-rate parts can be forecast is further enhanced.

Figure 10:
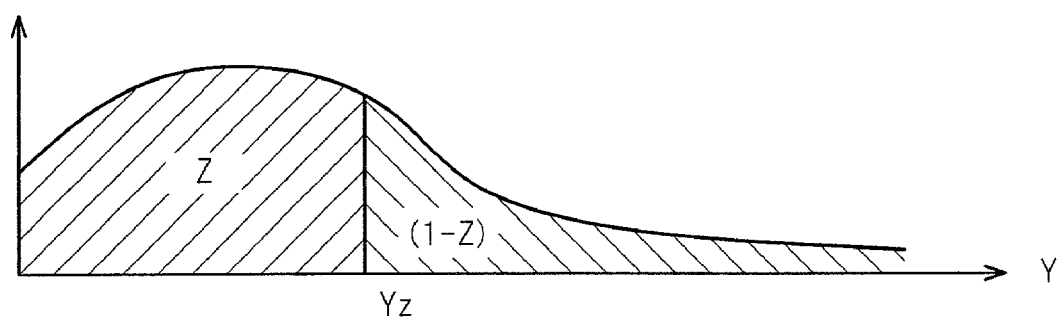
FIG. 10 is an explanatory diagram showing a forecast of number of orders conducted based on the occurrence rate probability distribution of number of orders of FIG. 9.

The future number of orders of the very-low-order-rate (1) parts is then forecast (calculated) based on the calculated occurrence rate probability distribution of number of orders (total number of orders) during N months. More specifically, as shown in FIG. 10, it is forecast (calculated) that Yz number of parts are necessary to meet order for the very-low-order-rate (1) parts in the category concerned during N months at a coverage (target supply rate relative to orders) of Z %.

As the period of N months can be set to any length desired, it suffices to appropriately select a value corresponding to the desired forecast period.

The fact that the number of orders of the parts (more precisely, the total number of the orders of the parts) during a period of desired length can be forecast is thus one feature characterizing this future order forecasting method.

Accurate forecasting of orders can therefore be achieved by appropriately setting the period in accordance with the desired forecast period or forecast number. In addition, it is also possible, for example, to narrow down the number of orders by setting a period of short length or to narrow down the number of orders by checking whether the order occurrence rate probability represented by the vertical axis is not less than a predetermined value.

The foregoing will now be explained with reference to the configuration shown in FIG. 1. The data obtained by Monte Carlo simulation in the MCS ENG 10g (occurrence rate probability distribution of total number of orders during N months) are sent to a calculated result display ENG 10h.

Based on the data, the calculated result display ENG 10h forecasts (calculates) the future number of orders of the very-low-order-rate (1) parts and displays or prints the result of the forecast by means of a cathode ray tube ("CRT") or printer (neither shown).

The output of the MCS ENG 10g is also sent to a forecast accuracy check data generating ENG 10i, which checks whether the very-low-order-rate (1) part category is appropriate and, if necessary, resets the category or designates new one.

Specifically, based on the order record up to a certain past time point of the very-low-order-rate (1) parts in the category concerned, the forecast accuracy check data generating ENG 10i forecasts orders from that time point to another past time point. It then checks the forecast accuracy by comparing the result of the forecast with the record data and resets the category or designates new one when the forecast accuracy is determined to be low.

Setting a smaller number of categories makes the processing work simpler but lowers the forecast accuracy. As mentioned earlier, therefore, in this embodiment, the number of categories is, for example, made 24, 50 or more.

Figure 11:
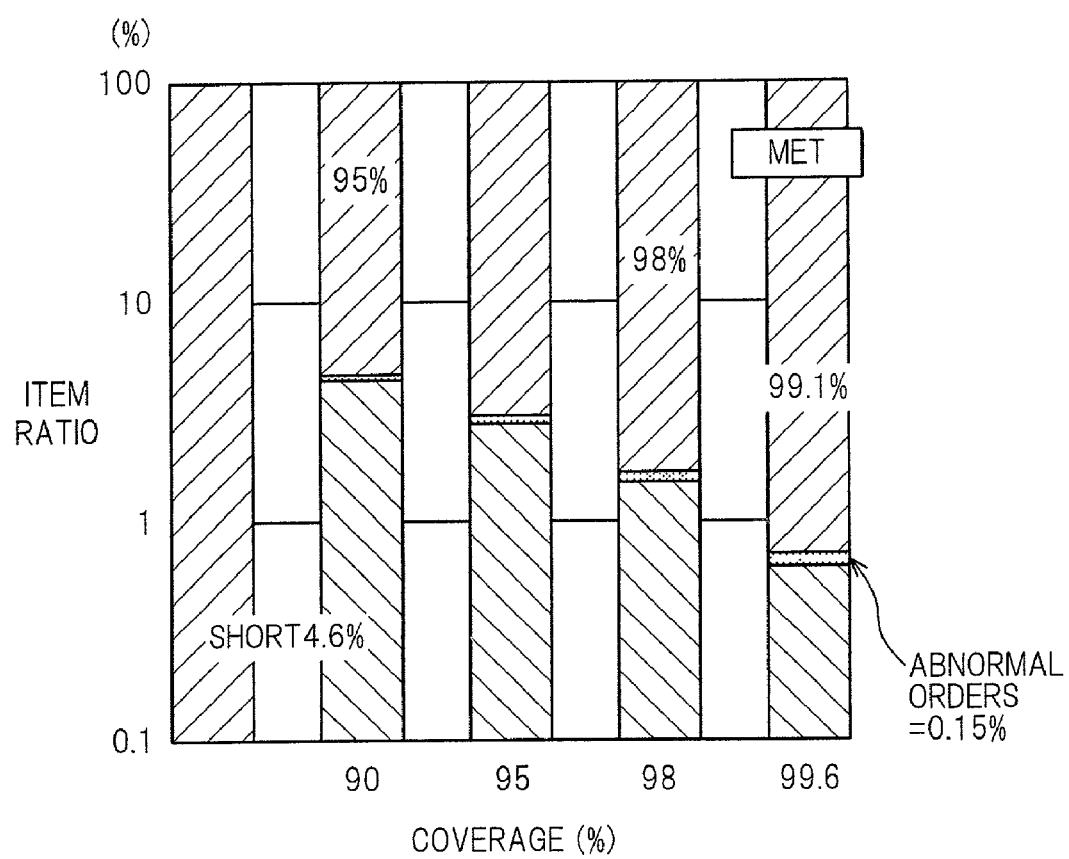
FIG. 11 is a graph showing the result of a forecast accuracy check made with respect to an order forecast by the Monte Carlo simulation of FIG. 8.

FIG. 11 shows the results obtained when the future order forecasting method of this embodiment was applied to 239 thousand items of low-order-rate parts classified into 24 categories and the forecast accuracy was checked and compared with the record of past orders.

While the forecast accuracy check data generating ENG 10i conducts similar processing, what is shown in FIG. 11 differs therefrom in number of items etc. "Item" means part number attached with the part destination. Therefore, when the same part is attached with Japan and the US as destinations, the number of items is 2.

FIG. 11 shows the short ratio and the meet ratio (vertical axis) at coverages of 90%, 95%, 98% and 99.6% with respect to the 239 thousand items in the case of assuming that part inventories forecast by the order forecasting method of this embodiment are stocked.

"Short ratio" means the percentage of orders not satisfied and "meet ratio" means the percentage of orders satisfied. Although the short ratio is ordinarily the value obtained by subtracting the meet ratio from 100%, owing to the occurrence of abnormal orders during the check period, the sum of the short ratio, meet ratio and abnormal orders (e.g., 0.15% at coverage of 99.6%) were defined as 100%.

The fact that, as can be seen from the figure, the desired meet ratios were substantially achieved verified the efficacy of the future order forecasting method of this embodiment.

Returning to the explanation of FIG. 1, the output of the very-low-order-rate (2) part input data generating ENG 10e is sent directly to a very-low-order-rate (2) part order forecast ENG 10j and is also sent to the very-low-order-rate (2) part order forecast ENG 10j through the MCS ENG 10g.

To summarize, in this embodiment, orders for very-low-order-rate (1) parts is forecast in the foregoing manner using Monte Carlo simulation, while the regression analysis technique is used with regard to very-low-order-rate (2) parts. In determining the straight regression line in the regression analysis, moreover, the order forecast value (number of orders) obtained by Monte Carlo simulation is added to the known data. In other words, in the case of very-low-order-rate (2) parts, the merits of Monte Carlo analysis and regression analysis are combined to conduct the forecast.

Figure 12:
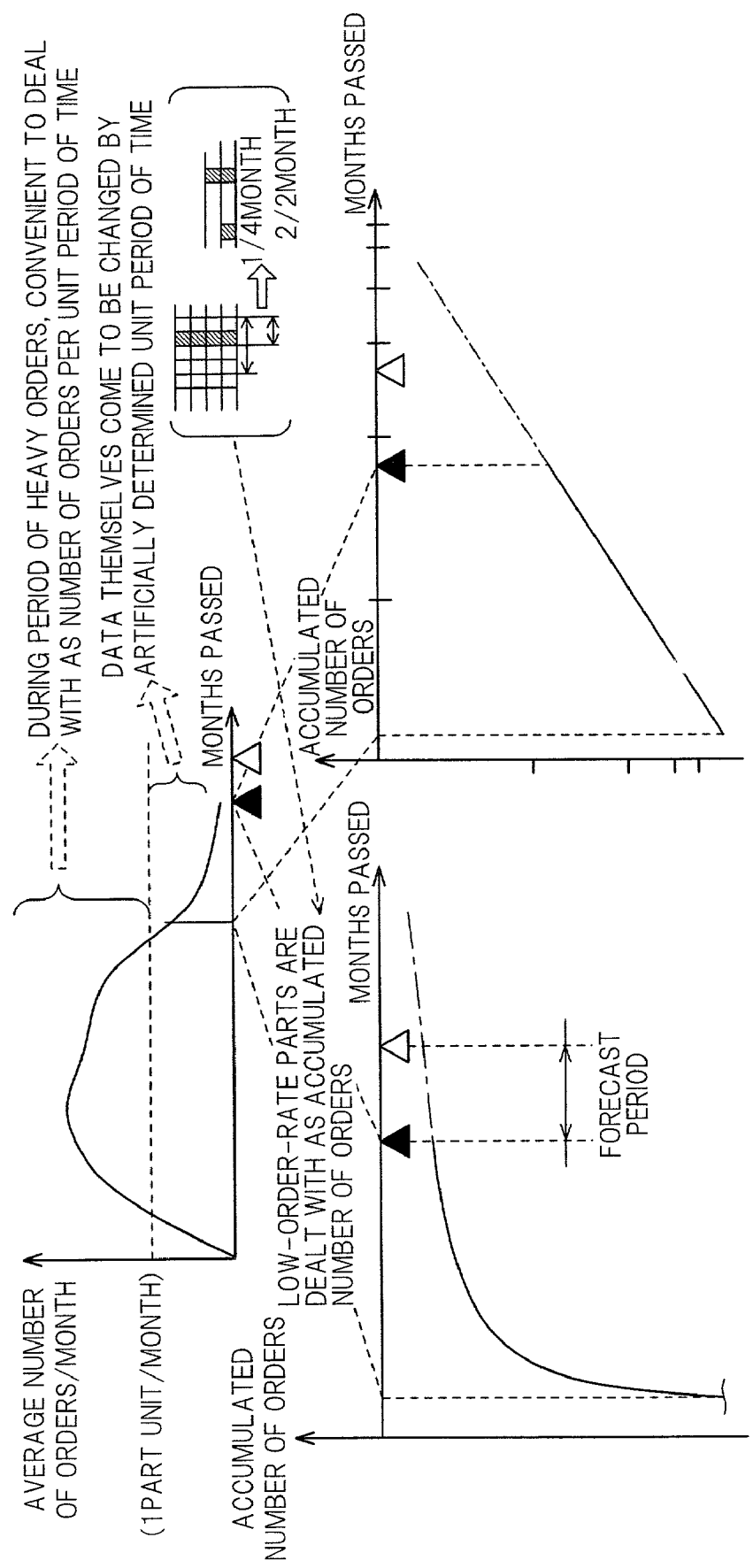
FIG. 12 is an explanatory diagram showing an order forecast by regression analysis conducted in the future order forecasting method of FIG. 1.

This will be explained with reference to FIG. 12. As noted at the upper part of the figure, when orders are heavy, it is most conveniently dealt with as order volume (number of orders) per unit time. When order volume declines to a low level, however, an artificially set unit time causes the data themselves to change.

Therefore, as shown at the lower left of the figure, low-order-rate parts (more precisely, very-low-order-rate (2) parts) are dealt with in terms of accumulated number of orders. Specifically, an exponential function is used to linearize the accumulated number of orders (record data) as shown at the lower right and the straight regression line is drawn from the result.

Figure 13:
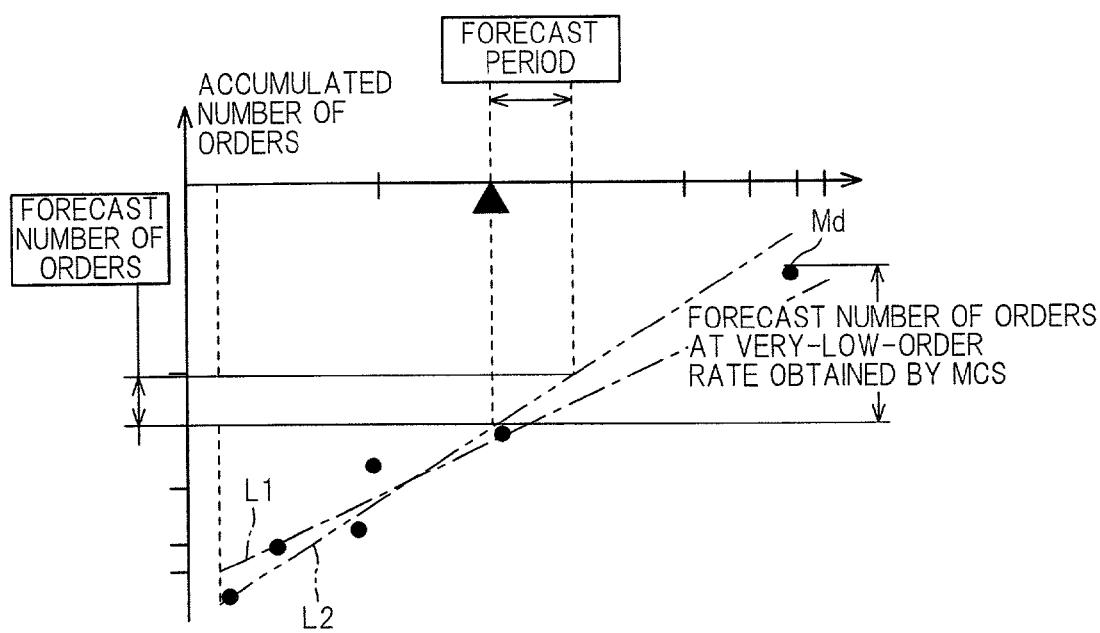
FIG. 13 is an explanatory diagram also showing an order forecast by regression analysis conducted in the future order forecasting method of FIG. 1.

Concretely speaking, as shown in FIG. 13, a known technique such as the method of least squares is used to determine the regression coefficient and draw a straight line, and arbitrary values among the data obtained by Monte Carlo simulation (denoted by reference symbol Md) are used to determine the straight regression line.

Although regression analysis and Monte Carlo analysis are fundamentally different techniques, the foregoing arrangement was adopted because, as stated earlier, when orders for a part decline, the part ordinarily first becomes a very-low-order-rate (2) part and then becomes a very-low-order-rate (1) part and, furthermore, the very-low-order-rate (1) part order forecast obtained by Monte Carlo simulation was confirmed to be highly accurate.

Notwithstanding, since, as noted earlier, the very-low-order-rate (2) parts precede the very-low-order-rate (1) parts in time, the forecasting of future orders for the very-low-order-rate (2) parts must be carried out without order forecasting by Monte Carlo simulation with respect to the parts concerned.

In this embodiment, therefore, the described method is constituted for the very-low-order-rate (1) parts, and when the order occurrence probability distribution as a function of time and the order occurrence probability distribution as a function of the ratio of number of orders are determined for every category with regard to the very-low-order-rate (2) parts, a shortened period of, say, several months is used instead of 24 months when, for example, calculating the ratio of number of orders.

In FIG. 13, L1 is a straight regression line obtained solely from known data and L2 is a straight regression line obtained from known data and a value Md obtained by modified Monte Carlo simulation. In the figure, the straight regression line L1 is presented only as a reference. The straight regression line L2 is used in the future order forecasting method of this embodiment.

Values on the straight regression line L2 corresponding to the forecast period indicated on the horizontal axis in FIG. 13 are therefore the forecast number of orders indicated on the vertical axis. As in the case of the very-low-order-rate (1) parts, future orders for the very-low-order-rate (2) parts are also forecast as number of orders during a period of desired length.

Since future order forecasting with regard to the very-low-order-rate (2) part is conducted by combining the merits of Monte Carlo analysis and regression analysis in this manner, the accuracy with which the future number of orders can be forecast is further enhanced, although the transaction behaviors of the very-low-order-rate (2) parts have not necessarily come to exhibit the characteristic of the very-low-order rate (1) parts explained with respect to FIG. 3.

Returning to the explanation of FIG. 1, the very-low-order-rate (2) part order forecast ENG 10j determines the straight regression line L2 in the foregoing manner based on the outputs of the very-low-order-rate (2) part input data generating ENG 10e and the MCS ENG 10g.

The output of the very-low-order-rate (2) part order forecast ENG 10j is sent to the calculated result display ENG 10h together with the output of the MCS ENG 10g, which forecasts (calculates) the future number of orders of the very-low-order-rate (2) parts and displays or prints the result of the forecast by means of a CRT or printer (neither shown).

Owing to the foregoing configuration, this embodiment can accurately forecast future number of orders of low-order-rate parts for which the number of orders has fallen to around one unit per month or less and, by this, enables the inventory management quantity to be appropriately determined.

Moreover, since future orders of the low-order-rate parts can be accurately forecast, appropriate decisions can be made regarding whether or not to scrap the dies used to manufacture parts.

In addition, since future orders of the low-order-rate parts can be accurately forecast, management strategy regarding inventory management, including coverage, can be readily determined.

Further, as shown in FIG. 1, since the forecast accuracy check data generating ENG 10i checks the forecast accuracy and resets (changes) the category based on the results of the check when necessary, i.e., since the embodiment is configured so that the future order forecasting method can be evolved, the forecasting accuracy can be constantly enhanced.

What is more, since classification into very-low-order-rate (1) parts and very-low-order-rate (2) parts is carried out, the number of orders is forecast with regard to the former using Monte Carlo analysis and the number of orders is forecast with regard to the latter using Monte Carlo analysis and regression analysis, i.e., since the merits of the two analyses are combined, the forecast accuracy is further enhanced.

In other words, the accuracy with which the future number of orders can be forecast is further enhanced even in cases where the transaction behaviors of the very-low-order-rate (2) parts have not necessarily come to exhibit the characteristic, unlike what was explained with respect to FIG. 3 regarding the very-low-order-rate (1) parts.

Moreover, since future orders are forecast as number of orders (total number of orders) during a period of desired length, orders can be optimally forecast in accordance with the desired forecast period or forecast number.

As described in the foregoing, this embodiment is configured to have a method of forecasting future orders of parts, more specifically, low-order-rate parts for products (four-wheeled vehicles, motorcycles, general-purpose products) sold to customers, whose order rates have been fallen below a predetermined level and which are stored for periods and will be sold when ordered, comprising the steps of: determining a time-course record of orders with respect to each part, extracting low-order-rate parts whose order records show order rate to have fallen below the predetermined level (very-low-order-rate (1) parts; data extracting and processing ENG 10a and very-low-order-rate part order forecast DB 10b), determining from each such order record at least one parameter indicating a characteristic of orders after the order rate fell below the predetermined level, classifying the extracted low-order-rate parts into multiple categories, using the parameter indicating the characteristic of orders to calculate for each of the multiple categories an order occurrence probability distribution (order characteristic analysis data generating ENG 10c, very-low-order-rate (1) part MCS input data generating ENG 10d, order occurrence discriminator and order number discriminator DB 10f, forecast accuracy check data generating ENG 10i, and MCS ENG 10g), carrying out Monte Carlo simulation based on the calculated order occurrence probability distributions to determine occurrence rate probability distributions of number of orders during a predetermined period (N months; MCS ENG 10g), and forecasting future number of orders (total number of orders) of the low-order-rate parts based on the calculated occurrence rate probability distributions of number of orders during the predetermined period (calculated result display ENG 10h).

In this configuration, a time-course record of orders is determined with respect to each part, low-order-rate parts whose order records show order rate to have fallen below the predetermined level are extracted, at least one parameter indicating a characteristic of orders after the order rate fell below the predetermined level is determined from each such order record, the extracted low-order-rate parts are classified into multiple categories, the parameter indicating the characteristic of orders is used to calculate for each of the multiple categories an order occurrence probability distribution, Monte Carlo simulation is carried out based on the calculated order occurrence probability distributions to determine occurrence rate probability distributions of number of orders during a predetermined period, and future number of orders of the low-order-rate parts are forecast based on the calculated occurrence rate probability distributions of number of orders during the predetermined period. Since the future number of orders can therefore be accurately forecast with respect to parts whose order rates have fallen to a low level, inventory management quantities can be appropriately determined. In addition, appropriate decisions can be made regarding whether or not to scrap the dies used to manufacture parts, and management strategy regarding inventory management, including coverage, can be readily determined.

The method further includes the steps of: determining a time-course record of orders with respect to each part, extracting second low-order-rate parts whose order records show order rate to have fallen below a second predetermined level higher than said predetermined level (very-low-order-rate (2) parts; data extracting and processing ENG 10a and very-low-order-rate part order forecast DB 10b), classifying the extracted low-order-rate parts into multiple categories, using the parameter indicating the characteristic of orders to calculate for each of the multiple categories an order occurrence probability distribution (order characteristic analysis data generating ENG 10c, very-low-order-rate (1) part MCS input data generating ENG 10*d*, order occurrence discriminator and order number discriminator DB 10*f*, forecast accuracy check data generating ENG 10*i*, and MCS ENG 10*g*), carrying out Monte Carlo simulation based on the calculated order occurrence probability distributions to determine occurrence rate probability distributions of number of orders during a predetermined period (MCS ENG 10*g*), calculating the future number of orders of the second low-order-rate parts based on the calculated occurrence rate probability distributions of number of orders during the predetermined period, and forecasting the future number of orders of the second low-order-rate parts by regression analysis based on the order records before order rate fell below the second predetermined level and the calculated number of orders (very-low-order-rate (2) part order forecast ENG 10*j*, and calculated result display ENG 10*h*).

In this configuration, a time-course record of orders is determined with respect to each part, second low-order-rate parts whose order records show order rate to have fallen below a second predetermined level higher than said predetermined level are extracted, the extracted low-order-rate parts are classified into multiple categories, the parameter indicating the characteristic of orders is used to calculate for each of the multiple categories an order occurrence probability distribution, Monte Carlo simulation is carried out based on the calculated order occurrence probability distributions to determine occurrence rate probability distributions of number of orders during a predetermined period, the future number of orders of the second low-order-rate parts is calculated based on the calculated probability distributions of number of ordered parts during the predetermined period, and the future number of ordered second low-order-rate parts are forecast by regression analysis based on the order records before order rate fell below the second predetermined level and the calculated number of orders. In other words, the merits of Monte Carlo analysis and regression analysis are combined to conduct the forecast. The accuracy with which the future number of orders can be forecast is therefore further enhanced even in cases where the transaction behaviors of the different low-order-rate parts have not necessarily come to exhibit the same characteristic.

The at least one parameter indicating the characteristic of orders is one or both of an order occurrence interval (months; shown in FIG. 4) and a ratio of number of orders (shown in FIG. 5).

When in this manner at least one of the order occurrence interval and a ratio of number of orders is focused on as a parameter indicating a characteristics of orders, then when the order occurrence probability distribution calculated based thereon is input to the Monte Carlo simulation, occurrence rate probability distributions of number of orders can be calculated for like predetermined periods as the output of the Monte Carlo simulation. As a result, the accuracy with which the future number of orders of the low-order-rate parts can be forecast is further enhanced.

The ratio of number of orders is the ratio of the number of orders after order expired to the number of orders before order expired, more specifically, the ratio of number of orders is (number of orders in month in which orders occurred after orders were nil for 24 months)/(number of orders immediately before orders were nil for 24 months).

By taking the order behavior before and after order expiration into account from the aspect of number of orders, it becomes possible to calculate the order occurrence probability distribution accurately. As a result, the accuracy with which the future number of orders of the low-order-rate parts is forecast, is further enhanced.

Further, this embodiment is configured to have a method of forecasting future orders of parts, more specifically, low-order-rate parts for products (four-wheeled vehicles, motorcycles, general-purpose products) sold to customers, whose order rates have been fallen below a predetermined level and which are stored for periods and will be sold when ordered, comprising the steps of: determining a time-course record of orders with respect to each part, extracting low-order-rate parts whose order records show order rate to have fallen below the predetermined level (very-low-order-rate (1) parts; data extracting and processing ENG 10*a* and very-low-order-rate part order forecast DB lob), determining from each such order record an order occurrence probability distribution as a function of time and an order occurrence probability distribution as a function of a ratio of number of orders (order characteristic analysis data generating ENG 10*c*, very-low-order-rate (1) part MCS input data generating ENG 10*d*, order occurrence discriminator and ordered parts number discriminator DB 10*f*, forecast accuracy check data generating ENG 10*i*, and MCS ENG 10*g*), carrying out Monte Carlo simulation based on the calculated order occurrence probability distributions to determine occurrence rate probability distributions of number of orders during a predetermined period (N months; MCS ENG 10*g*), and forecasting future number of orders of the low-order-rate parts based on the calculated occurrence rate probability distributions of number of orders during the predetermined period (calculated result display ENG 10*h*).

In this configuration, a time-course record of orders is determined with respect to each part, low-order-rate parts whose order records show order rate to have fallen below the predetermined level are extracted, an order occurrence probability distribution as a function of time and an order occurrence probability distribution as a function of a ratio of number of orders are determined from each such order record, Monte Carlo simulation is carried out based on the calculated order occurrence probability distributions to determine occurrence rate probability distributions of number of orders during a predetermined period, and future number of orders of the low-order-rate parts is forecast based on the calculated occurrence rate probability distributions of number of orders during the predetermined period. In other words, at least one of the order occurrence probability distribution as a function of time and the order occurrence probability distribution as a function of a ratio of number of orders is focused on in calculating the order occurrence probability distributions input to the Monte Carlo simulation, so that the number of orders can be forecast by calculating occurrence rate probability distributions of number of orders for like predetermined periods as the output of the Monte Carlo simulation. As a result, the future number of orders of the low-order-rate parts can be accurately forecast and, in turn, inventory management quantities can be appropriately determined. In addition, appropriate decisions can be made regarding whether or not to scrap the dies used to manufacture parts, and management strategy regarding inventory management strategy, including coverage, can be readily determined.

A configuration is also provided wherein the extracted low-order-rate parts are classified into multiple categories (e.g., 24 or 50) and the order occurrence probability distribution is determined for each of the multiple categories (order characteristic analysis data generating ENG 10*c*, very-low-order-rate (1) part MCS input data generating ENG 10*d*, order occurrence discriminator and order number discriminator DB 10*f*, forecast accuracy check data generating ENG 10*i*, and MCS ENG 10*g*).

In this configuration, the extracted low-order-rate parts are classified into multiple categories and the order occurrence probability distribution is determined for each of the multiple categories. Since the order behavior peculiar to the parts can therefore be taken into account, the accuracy with which the future number of orders of the low-order-rate parts can be forecast is further enhanced.

A configuration is further provided with the steps of: checking accuracy of the forecast number of orders; and changing the categories based on a result of checking (forecast accuracy check data generating ENG 10*i*).

In this configuration, the accuracy of the forecast number of orders of the parts is checked and the categories are changed based on the result of the check. In other words, the order forecast is evolved. As a result, the accuracy with which the future number of orders of the low-order-rate parts are forecast is constantly enhanced.

Although periods and time intervals were defined in units of months in the foregoing, they can instead be defined in terms of any of various other units indicative of period or time interval, such as day, week, fortnight, season or year.

The entire disclosure of Japanese Patent Application No. 2000-260918 filed on Aug. 30, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A method of forecasting future orders of parts for products to be sold to customers, comprising the steps of:
   determining a time-course record of orders with respect to each part and extracting low-order-rate parts whose order records show an order rate to have fallen below a predetermined level;
   determining from each such order record at least one parameter indicating a characteristic of orders after the order rate fell below the predetermined level, classifying the extracted low-order-rate parts into multiple categories and using the parameter indicating the characteristic of orders to calculate for each of the multiple categories an order occurrence probability distribution;
   carrying out Monte Carlo simulation based on the calculated order occurrence probability distributions to determine occurrence rate probability distributions of number of orders during a predetermined period; and
   forecasting future number of orders of the low-order-rate parts based on the calculated occurrence rate probability distributions of number of orders during the predetermined period and outputting the future number of orders of the low-order rate parts,
   wherein the parameter indicating the characteristic of orders is a ratio of number of orders, such that the number of orders occurred after orders were non-existent for a fixed time divided by the number of orders immediately before the orders were non-existent for the fixed time.

2. A method according to claim 1, further including the steps of:
   determining a time-course record of orders with respect to each part and extracting second low-order-rate parts whose order records show an order rate to have fallen below a second predetermined level higher than said predetermined level;
   classifying the extracted second low-order-rate parts into multiple categories and using the parameter indicating the characteristic of orders to calculate for each of the multiple categories an order occurrence probability distribution;
   carrying out Monte Carlo simulation based on the calculated order occurrence probability distributions to determine occurrence rate probability distributions of number of orders during a predetermined period;
   calculating future number of orders of the second low-order-rate parts based on the calculated occurrence rate probability distributions of number of orders during the predetermined period; and
   forecasting the future number of orders of the second low-order-rate parts by regression analysis based on order records before order rate fell below the second predetermined level and the calculated number of orders.

3. A method according to claim 1, further including the steps of:
   checking accuracy of the forecast number of orders; and
   changing the categories based on a result of checking.

4. A method of forecasting future orders of parts for products to be sold to customers, comprising the steps of:
   determining a time-course record of orders with respect to each part and extracting low-order-rate parts whose order records show an order rate to have fallen below a predetermined level;
   determining from each such order record an order occurrence probability distribution as a function of time and an order occurrence probability distribution as a function of a ratio of number of orders, such that the number of orders occurred after orders were non-existent for a fixed time divided by the number of orders immediately before the orders were non-existent for the fixed time;
   carrying out Monte Carlo simulation based on the calculated order occurrence probability distributions to determine occurrence rate probability distributions of number of orders during a predetermined period; and
   forecasting future number of orders of the low-order-rate parts based on the calculated occurrence rate probability distributions of number of orders during the predetermined period and outputting the future number of orders of the low-order rate parts.

5. A method according to claim 4, wherein the extracted low-order-rate parts are classified into multiple categories and the order occurrence probability distribution is determined for each of the multiple categories.

6. A method according to claim 4, further including the steps of:
   checking accuracy of the forecast number of orders; and
   changing the categories based on a result of checking.

7. A system for forecasting future orders of parts for products to be sold to customers, comprising:
   time-course order record determining means for determining a time-course record of orders with respect to each part and extracting low-order-rate parts whose order records show an order rate to have fallen below a predetermined level;
   order occurrence probability distribution determining means for determining from each such order record at least one parameter indicating a characteristic of orders after the order rate fell below the predetermined level, and for classifying the extracted low order-rate parts into multiple categories and using the parameter indicating the characteristic of orders to calculate for each of the multiple categories an order occurrence probability distribution;

Monte Carlo simulation means for carrying out Monte Carlo simulation based on the calculated order occurrence probability distributions to determine occurrence rate probability distributions of number of orders during a predetermined period; and forecasting means for forecasting future number of orders of the low-order-rate parts based on the calculated occurrence rate probability distributions of number of orders during the predetermined period and outputting the future number of orders of the low-order rate parts, wherein the parameter indicating the characteristic of orders is a ratio of number of orders, such that the number of orders occurred after orders were non-existent for a fixed time divided by the number of orders immediately before the orders were non-existent for the fixed time.

8. A system according to claim 7, further including:

second time-course order record determining means for determining a time-course record of orders with respect to each part and extracting second low-order-rate parts whose order records show an order rate to have fallen below a second predetermined level higher than said predetermined level;

second order occurrence probability distribution determining means for classifying the extracted second low-order-rate parts into multiple categories and using the parameter indicating the characteristic of orders to calculate for each of the multiple categories an order occurrence probability distribution;

Monte Carlo simulation means for carrying out Monte Carlo simulation based on the calculated order occurrence probability distributions to the second low-order-rate parts to determine occurance rate probability distributions of number of orders during a predetermined period;

order calculating means for calculating future number of orders of the second low-order-rate parts based on the calculated occurrence rate probability distributions of number of orders during the predetermined period; and forecasting means for forecasting the future number of orders of the second low-order-rate parts by regression analysis based on order records before order rate fell below the second predetermined level and the calculated number of orders.

9. A system according to claim 7, further including of:

checking means for checking accuracy of the forecast number of orders; and changing means for changing the categories based on a result of checking.

10. A system for forecasting future orders of parts for products to be sold to customers, comprising:

time-course order record determining means for determining a time-course record of orders with respect to each part and extracting low-order-rate parts whose order records show an order rate to have fallen below a predetermined level;

order occurrence probability distribution determining means for determining from each such order record an order occurrence probability distribution as a function of time and an order occurrence probability distribution as a function of a ratio of number of orders, such that the number of orders occurred after orders were non-existent for a fixed time divided by the number of orders immediately before the orders were non-existent for the fixed time;

Monte Carlo simulation means for carrying out Monte Carlo simulation based on the calculated order occurrence probability distributions to determine occurrence rate probability distributions of number of orders during a predetermined period; and forecasting means for forecasting future number of orders of the low-order-rate parts based on the calculated occurrence rate probability distributions of number of orders during the predetermined period and outputting the future number of orders of the low-order rate parts.

11. A system according to claim 10, wherein the extracted low-order-rate parts are classified into multiple categories and the order occurrence probability distribution is determined for each of the multiple categories.

12. A system according to claim 10, further including the steps of:

checking means for checking accuracy of the forecast number of orders; and changing means for changing the categories based on a result of checking.

* * * * *

UNITED STATES PATENT AND TRADEMARK OFFICE
CERTIFICATE OF CORRECTION

PATENT NO. : 7,225,140 B2 Page 1 of 1
APPLICATION NO. : 09/929356
DATED : May 29, 2007
INVENTOR(S) : Tameo Yanagino et al.

It is certified that error appears in the above-identified patent and that said Letters Patent is hereby corrected as shown below:

IN THE CLAIMS:

Claim 8, line 35, delete "to" and substitute therefor -- of --.

Claim 9, line 1, after "including" and insert therefor -- the steps --.

Signed and Sealed this

Fourth Day of December, 2007

JON W. DUDAS
*Director of the United States Patent and Trademark Office*